(12) United States Patent
Johnson et al.

(10) Patent No.: US 6,390,132 B1
(45) Date of Patent: May 21, 2002

(54) FLUID STREAM PULSE DAMPER

(75) Inventors: Joel S. Johnson; Kevin J. Knox, both of Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/731,634

(22) Filed: Dec. 7, 2000

(51) Int. Cl.$^7$ .............................................. F16L 55/04
(52) U.S. Cl. ............................ 138/30; 138/39; 138/43
(58) Field of Search ............................ 138/43, 30, 39, 138/46

(56) References Cited

U.S. PATENT DOCUMENTS

| | | | |
|---|---|---|---|
| 585,084 A | 6/1897 | Cook | |
| 947,431 A | 1/1910 | De Grandsagne | |
| 1,013,183 A | 1/1912 | Gaa | |
| 1,163,128 A | 12/1915 | Brauer | |
| 1,829,737 A | 11/1931 | Compo | |
| 1,859,400 A | 5/1932 | Kersey | |
| 2,072,372 A | 3/1937 | Kingsley | |
| 2,787,288 A * | 4/1957 | Shataloff et al. | 138/46 |
| 3,153,579 A | 10/1964 | Levey et al. | |
| 3,154,174 A | 10/1964 | Haining | |
| 3,338,265 A * | 8/1967 | Kennedy | 138/46 |
| 3,526,239 A * | 9/1970 | Oroza | 138/46 |
| 3,620,330 A | 11/1971 | Hall | |
| 3,703,937 A | 11/1972 | Tenney | |
| 3,722,854 A | 3/1973 | Parola | |
| 3,857,413 A * | 12/1974 | Zahid | 138/43 |
| 3,958,605 A * | 5/1976 | Nishizu et al. | 138/46 |
| 4,079,808 A | 3/1978 | Mizuno et al. | |
| 4,152,786 A * | 5/1979 | Clark et al. | 138/30 |
| 4,161,996 A | 7/1979 | Dolejsi | |
| 4,163,461 A * | 8/1979 | Jacobellis | 138/30 |
| 4,484,659 A | 11/1984 | Buchwalder | |
| 4,609,068 A | 9/1986 | Backlund | |
| 4,633,900 A * | 1/1987 | Suzuki | 138/46 |
| 4,699,244 A | 10/1987 | Bergquist et al. | |
| 4,903,486 A | 2/1990 | Finkle | |
| 5,489,753 A | 2/1996 | Gibel | |
| 5,582,210 A * | 12/1996 | Bartholomew | 138/46 |
| 5,583,325 A | 12/1996 | Schutte et al. | |
| 5,739,483 A | 4/1998 | Yashiro et al. | |
| 5,740,837 A * | 4/1998 | Chiang | 138/45 |
| 5,819,802 A * | 10/1998 | Fan | 138/30 |
| 5,901,751 A * | 5/1999 | Huo | 138/46 |
| 6,220,301 B1 * | 4/2001 | Guthler | 138/39 |

* cited by examiner

*Primary Examiner*—James Hook
(74) *Attorney, Agent, or Firm*—Taylor & Aust

(57) ABSTRACT

A fluid stream pulse damper having a fluid conduit defining a fluid path and a fluid flow direction. The conduit has an inlet end and an outlet end. A damper body in the conduit intersects the fluid path. An energy absorber attached to the damper body operates in resistance to fluid flowing in the conduit.

8 Claims, 1 Drawing Sheet

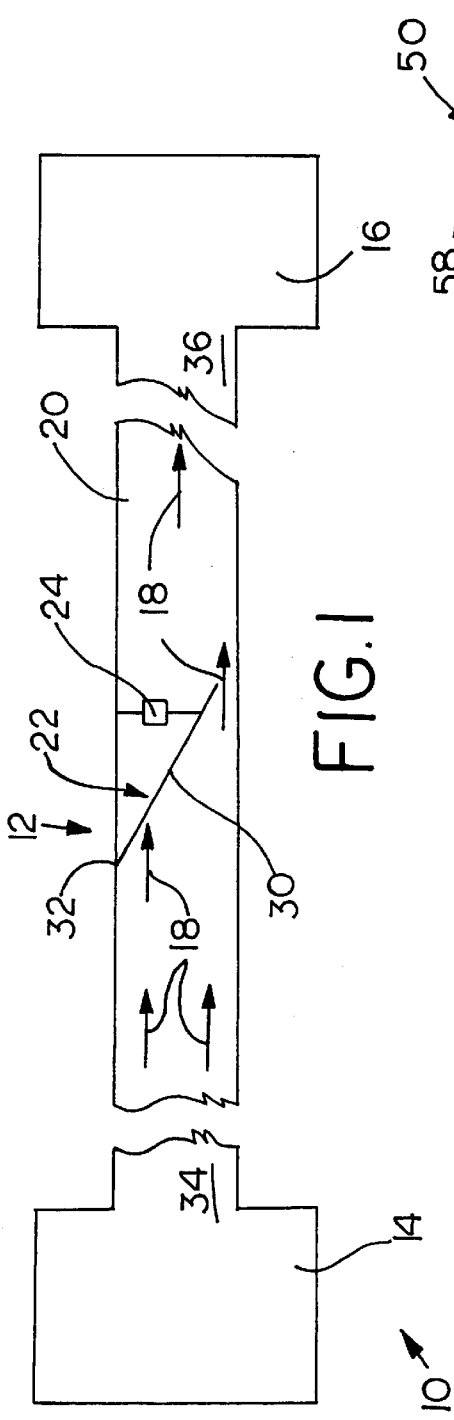
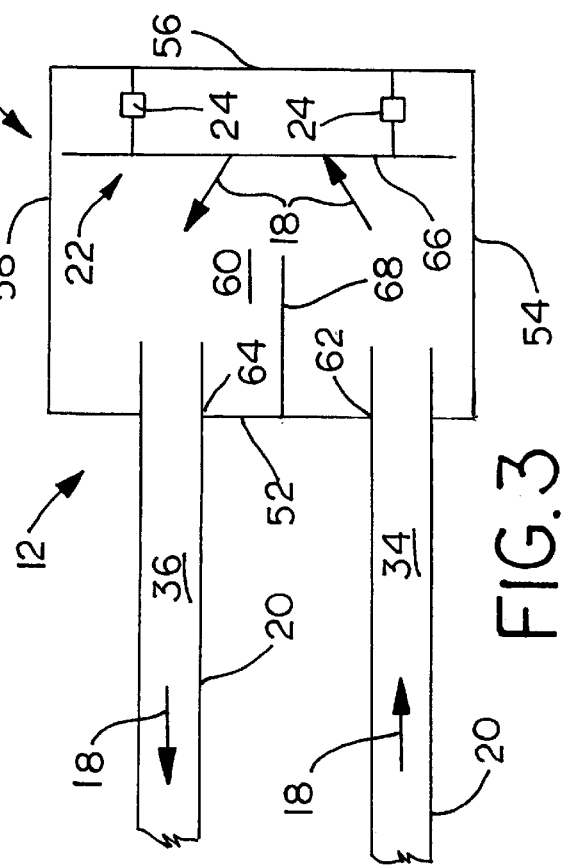
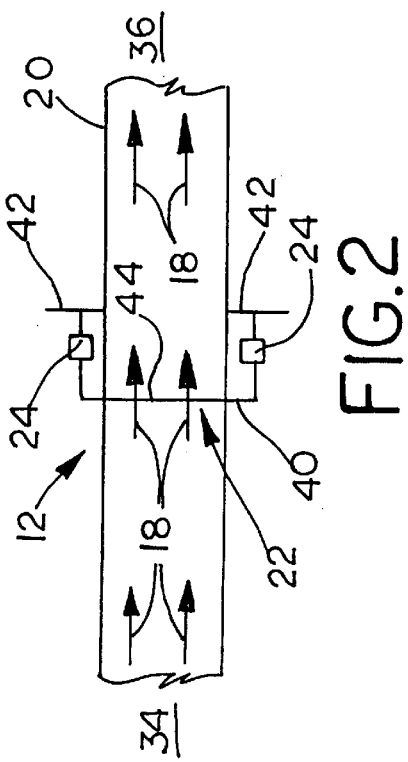
FIG.1
FIG.2
FIG.3

FLUID STREAM PULSE DAMPER

TECHNICAL FIELD

The present invention relates to fluid stream control devices, and more particularly to a damping device for attenuating pulses in a gaseous fluid stream.

BACKGROUND ART

Gaseous fluid streams, from industrial processes or the like, can exhibit wide swings or variations in characteristics such as velocity and pressure, often exhibiting significant pulses. Large industrial engine exhaust streams include strong pulses corresponding to combustion cylinder cycles. Some engines demonstrate strong pulses in the inlet air stream as well. Other industrial processes including highly pressurized gas streams from reciprocating compressors also may exhibit pulses in the fluid stream. Such fluid streams can be objectionably noising.

Mufflers are known for reducing sound in engine exhaust streams. Known engine exhaust mufflers include expansion chambers and perforated baffles and tubes for reducing noise. It is known to use exhaust stream operated valves for controlling flow through an engine exhaust muffler.

Dissipative mufflers are known for reducing sound in gaseous fluid exhaust streams. U.S. Pat. No. 5,489,753 teaches one such dissipative muffler in which an expansion chamber includes perforated walls through which the exhaust air stream can escape, and an outlet passage having an auto adjusting baffle assemble. Normally, such mufflers are used near the end of an exhaust stream, just preceding release to ambient. Some such mufflers are of relatively complex construction.

It is further known to compensate for pulses in a fluid stream by passing the fluid stream through a multi-chambered apparatus in which the chambers are separated by a bladder or other flexible membrane. One of the chambers is charged with a compressible fluid. As the process fluid stream passes through the other of the chambers, fluctuations in the pressure of the process fluid stream are evened out by compression of the pre-charged fluid.

The present invention is directed to overcoming one or more of the problems as set forth above.

DISCLOSURE OF THE INVENTION

In one aspect of the invention, a fluid stream pulse damper comprises a fluid conduit defining a fluid path and a fluid flow direction in the fluid path. The conduit has an inlet end and an outlet end for all fluid flowing along the fluid path. A damper body is disposed in the conduit intersecting the fluid path. An energy absorber is attached to the damper body.

In another aspect of the invention, a method for damping pulse energy of a fluid stream comprises providing a fluid flow path and a body in the path; conducting a fluid along the fluid flow path; intercepting with the body at least a portion of the fluid flowing along the path; translating pulse energy in the fluid to mechanical energy in the body; and conducting away from the body all of the fluid conducted toward the body.

In yet another aspect of the invention, a gaseous fluid circuit comprises a source of gaseous fluid and a gaseous fluid destination. A fluid conduit defines a fluid path from the source to the destination. The conduit has an inlet end and an outlet end for all fluid flowing along the fluid path. A damper body is disposed in the conduit, intersecting the fluid path. An energy absorber is attached to the damper body.

BRIEF DESCRIPTION OF THE DRAWINGS

FIG. 1 is a schematic representation of a gaseous fluid circuit having a fluid stream pulse damper of the present invention;

FIG. 2 is a partial schematic representation of a gaseous fluid circuit having a second embodiment of the fluid stream pulse damper of the present invention; and FIG. 3 is a partial schematic representation of a gaseous fluid circuit having a third embodiment of the fluid stream pulse damper of the present invention.

BEST MODE FOR CARRYING OUT THE INVENTION

Referring now to the drawings, and particularly to FIG. 1, there is shown a gaseous fluid circuit 10 having a fluid stream pulse damper 12 of the present invention. Pulse damper 12 is disposed between a source 14 of gaseous fluid and a gaseous fluid destination 16. Pulse damper 12 is provided for acting upon a fluid flowing from source 14 to destination 16, the fluid flowing along a fluid path in a fluid flow direction. The fluid path and fluid flow direction are each indicated in the drawings by arrows designated with the numeral 18.

Source 14 and destination 16 may be of many different embodiments. For example, source 14 may be an internal combustion engine, and the fluid flowing along fluid path 18 may be exhaust gas from an exhaust manifold of the internal combustion engine. So also, destination 16 may be subsequent exhaust gas processing, which may include an intake manifold of the internal combustion engine if pulse damper 12 is provided for an internal combustion engine having exhaust gas re-circulation. Those skilled in the art will readily understand that source 14 and destination 16 may also be stations in an industrial process having a fluid stream in which an undesirably high pulse is present, such as a high pressure gas stream from a reciprocating compressor.

Pulse damper 12 includes a fluid conduit 20 defining fluid path and flow direction 18 from source 14 to destination 16. A damper body 22 is disposed in fluid conduit 20, intersecting fluid path 18. An energy absorber 24, or a plurality thereof, are attached to damper body 22, generally in a manner to resist forces applied to damper 22 by a fluid flowing along fluid path and flow direction 18. Energy absorbers 24 may be springs, compressed fluid cylinders, elastomeric mountings, or the like.

In a first embodiment of pulse damper 12, shown in FIG. 1, damper body 22 includes a solid plate 30 disposed in fluid conduit 20 at an angle to fluid path and flow direction 18. Solid plate 30 is connected to fluid conduit 20 at a hinge 32, which allows solid plate 30 to be deflected by fluid flowing along fluid path and flow direction 18. One or more energy absorbers 24 are disposed between solid plate 30 and fluid conduit 20, in a manner to resist deflection of solid plate 30 caused by fluid flowing along fluid path and flow direction 18. At least some of the fluid flowing along fluid path and flow direction 18 impacts solid plate 30 as the fluid moves from an inlet end 34 to an outlet end 36 of fluid conduit 20.

In a second embodiment of pulse damper 12, shown in FIG. 2, damper body 22 includes a perforated plate 40 disposed in fluid conduit 20, generally transverse to the direction of fluid path and flow direction 18. Perforated plate 42 extends outwardly of fluid conduit 20, and is connected by a plurality of energy absorbers 24 to an external frame or mounting structure 42. Perforated plate 40 includes a plurality of openings or holes 44 therein, allowing fluid flowing along fluid path and flow direction 18 to pass through perforated plate 40, as the fluid passes from inlet end 34 to outlet end 36 of fluid conduit 20.

In a third embodiment of pulse damper 12, shown in FIG. 3, an expansion chamber 50 is provided. Expansion chamber 50 includes a plurality of outer walls, and in the embodiment shown includes four outer walls 52, 54, 56 and 58, defining an enclosed space 60. Expansion chamber 50 has an inlet opening 62 and an outlet opening 64 in fluid flow communication with enclosed space 60. Inlet end 34 of fluid conduit 20 is disposed in inlet opening 62, and outlet end 36 of fluid conduit 20 is disposed in outlet opening 64. In the embodiment shown, inlet opening 62 and outlet opening 64 are both provided in the same outer wall 52. Damper body 22 is provided within enclosed space 60, on outer wall 56, directly opposite outer wall 52. Damper body 22 is a solid deflection plate 66, which substantially fills a cross section of enclosed space 60, and is secured by a plurality of energy absorbers 24 to outer wall 56, or to a frame or support, not shown. To further direct flow within enclosed space 60, a partition 68 extends within enclosed space 60 from outer wall 52, between inlet opening 62 and outlet opening 64.

INDUSTRIAL APPLICABILITY

In use, pulse damper 12 is provided in gaseous fluid circuit 10, and receives a gaseous fluid stream from source 14, providing the fluid stream to destination 16. More specifically, inlet end 34 of fluid conduit 20 is in fluid flow communication with source 14, and provides a fluid path and flow direction 18 for fluid received from source 14. Outlet end 36 of fluid conduit 20 is in fluid flow communication with destination 16. Along fluid path and flow direction 18, between inlet end 34 and outlet end 36, at least some of the fluid impacts damper body 22, with at least some of the pulse energy of the fluid being transferred to energy absorber or absorbers 24.

In use of the embodiment shown in FIG. 1, solid plate 30 impedes flow as fluid flowing along fluid path and flow direction 18 encounters solid plate 30. Energy in the fluid stream forces solid plate 30 rearward, pivoting solid plate 30 at hinge 32. Movement of solid plate 30 is resisted by energy absorber or absorbers 24, which allow limited movement of solid plate 30. If the fluid stream contains significant pulse energy, solid plate 30 may pulsate in response to the energy pulses. Much of the pulse energy in the fluid stream is translated to mechanical energy in moving solid plate 30.

In use of the embodiment shown in FIG. 2, as fluid flowing along fluid path and flow direction 18 encounters perforated plate 40, perforated plate 40 is caused to vibrate. Vibrations of perforated plate 40 are transferred to energy absorbers 24. Again, pulse energy in the fluid stream is damped.

In use of the embodiment shown in FIG. 3, as fluid flowing along fluid path and flow direction 18 enters expansion chamber 50 via inlet end 34, it is directed toward deflection plate 66, and is restricted from flowing directly to outlet end 36 by partition 68. The fluid stream impacts deflection plate 66, causing the plate to vibrate. Again, energy absorbers 24 are used to remove pulse energy from the fluid stream. After impacting deflection plate 66, the fluid stream rebounds from deflection plate 66 toward outlet end 36.

In any of the aforedescribed embodiments of pulse damper 12, energy absorbers 24 should be provided of sufficient resistive force, in sufficient numbers and at appropriate placements to prevent damper body 22 from "bottoming out" in any but the most extreme operating conditions.

Other aspects, objects and advantages of this invention can be obtained from a study of the drawings, the disclosure and the appended claims.

What is claimed is:

1. A fluid stream pulse damper, comprising;

a fluid conduit defining a fluid path and a fluid flow direction in said fluid path, said conduit having an inlet end and an outlet end for all fluid flowing along said fluid path;

said conduit including an expansion chamber and an inlet and an outlet for said expansion chamber;

a damper body disposed in said expansion chamber opposite said expansion chamber inlet, said expansion chamber outlet being opposite said damper body in said expansion chamber, said expansion chamber inlet and outlet being on the same side of said damper body, said damper body intersecting said fluid path; and an energy absorber attached to said expansion chamber, and operating in resistance to fluid flowing in said fluid flow direction, said energy absorber adopted for allowing movement of said damper body to absorb energy in said fluid flowing in said conduit without decreasing said fluid path.

2. The damper of claim 1, said damper body being a solid plate.

3. The damper of claim 1, including a partition in said chamber between said expansion chamber inlet and said expansion chamber outlet.

4. A gaseous fluid circuit, comprising;

a source of gaseous fluid;

a gaseous fluid destination;

a fluid conduit defining a fluid path from said source to said destination, and having a fluid flow direction in said fluid path, said conduit having an inlet end and an outlet end for all fluid flowing along said fluid path;

said conduit including an expansion chamber and an inlet and an outlet for said expansion chamber;

a damper body disposed in said expansion chamber opposite said expansion chamber inlet, said damper body intersecting said fluid path, said expansion chamber outlet being opposite said damper body in said expansion chamber, said expansion chamber inlet and outlet being on the same side of said damper body; and an energy absorber attached to said damper body and operating in resistance to fluid flowing in said fluid flow direction, said energy absorber adapted to absorb energy from the gaseous fluid without increasing restriction in the fluid path.

5. The gaseous fluid circuit of claim 4, said source being an internal combustion engine.

6. The gaseous fluid circuit of claim 4, said destination being an internal combustion engine.

7. The gaseous fluid circuit of claim 4, said damper body being a solid plate.

8. The gaseous fluid circuit of claim 4, including a partition in said chamber between said expansion chamber inlet and said expansion chamber outlet.

* * * * *